United States Patent [19]

Otsuka

[11] 4,432,330
[45] Feb. 21, 1984

[54] EXHAUST GAS RECIRCULATION SYSTEM HAVING ELECTRICAL CONTROL MEANS

[75] Inventor: Kazutoshi Otsuka, Hiroshima, Japan

[73] Assignee: Toyo Kogyo Co., Ltd., Hiroshima, Japan

[21] Appl. No.: 342,344

[22] Filed: Jan. 25, 1982

[30] Foreign Application Priority Data

Jan. 27, 1981 [JP] Japan .................................. 56-10528

[51] Int. Cl.³ .......................................... F02M 25/06
[52] U.S. Cl. .............................. 123/571; 364/431.06; 364/431.12
[58] Field of Search .................... 123/571; 364/431.06, 364/431.12

[56] References Cited

U.S. PATENT DOCUMENTS

| | | | |
|---|---|---|---|
| 4,161,929 | 7/1979 | Nohira et al. | 123/571 |
| 4,210,112 | 7/1980 | Nakamura | 123/571 |
| 4,281,631 | 8/1981 | Yamaguchi | 123/571 |
| 4,347,570 | 8/1982 | Akiyama et al. | 123/571 |

FOREIGN PATENT DOCUMENTS 54-38437 3/1979 Japan .
54-91622 7/1979 Japan .

Primary Examiner—Wendell E. Burns
Attorney, Agent, or Firm—Fleit, Jacobson, Cohn & Price

[57] ABSTRACT

Exhaust gas recirculation system including an intake pressure operated control valve for controlling the amount of exhaust gas recirculated to the intake system and a suction pressure adjusting valve of a duty factor solenoid type for determining the suction pressure applied to the control valve. A control circuit is provided for applying an operating signal to the pressure adjusting valve. The control circuit is associated with a memory device having memories of duty factors adapted to be applied to the pressure adjusting valve and corresponding to various combinations of engine speed and engine intake pressure. The memory device further includes memories on duty factors with which the control valve starts to open under various intake suction pressure, and memories on compensation factors under various engine temperatures so that the duty factors are modified under a cold engine temperature in accordance with the intake suction pressure and the engine temperature.

7 Claims, 5 Drawing Figures

EXHAUST GAS RECIRCULATION SYSTEM HAVING ELECTRICAL CONTROL MEANS

The present invention relates to an engine exhaust gas recirculation system for recirculating a part of engine exhaust gas to the intake system to thereby suppress production of nitrogen oxides. More particularly, the present invention pertains to an electronically controlled exhaust gas recirculation system having recirculation control valve means provided in recirculating gas passage means for controlling the amount of exhaust gas recirculated to the intake system.

Hithertofore, proposals have already been made, for example by Japanese patent application 52-103953 filed on Aug. 30, 1977 and corresponding to the U.S. Pat. No. 4,161,929 issued to Nohira et al. on July 24, 1979, of an electronically controlled exhaust gas recirculation system which includes memory means for memorizing control data corresponding to various engine operating conditions and an appropriate one is addressed based on the signals representing the actual engine speed and the intake suction pressure to control the actuator for the recirculation control valve. The proposed system is advantageous in that an appropriate control of recirculation gas can be performed in accordance with the engine operating conditions which are represented by the engine speed and the intake suction pressure. However, in view of the fact that the most suitable rate of recirculation of the engine exhaust gas is dependent not only on the engine speed and the intake suction pressure but also on the engine temperature and the intake air temperature, the proposed system cannot offer a desirable result under a specific engine operating condition such as a cold engine operation.

The U.S. Pat. No. 4,210,112 suggests to adopt the engine temperature as one of the control factors, however, the patent does not teach anything with respect to the manner of using the engine temperature signal for determining the exhaust gas recirculation rate. In carrying out a temperature control, compensation factors may in advance be memorized for various specific conditions of engine operation and one of such memorized compensating factors may be taken out under a specific condition for compensating the control signal which is to be applied to the valve control device. However, since the recirculation control valve is usually of a type that utilizes the engine intake suction pressure as the actuating power source, a simple compensation of the control signal to the valve control device does not provide a most desirable recirculation rate. More specifically, the engine intake suction pressure changes in response to a change in the engine operating condition, there is a tendency that a simple compensation of the control signal causes an excessive compensation under a strong suction pressure and an insufficient compensation under a weak suction pressure.

It is therefore an object of the present invention to provide an engine exhaust gas recirculation system in which a desirable control of the gas recirculation rate can be obtained even under a special engine operating condition such as a cold engine operation.

Another object of the present invention is to provide an engine exhaust gas recirculation system in which the recirculation rate control signals can properly be compensated for special engine operating conditions.

According to the present invention, the above and other objects can be accomplished by an exhaust gas recirculation system for an internal combustion engine having intake and exhaust systems, said recirculation system comprising gas recirculation passage means for directing a part of engine exhaust gas from the exhaust system to the intake system, recirculation rate control valve means provided in said gas recirculation passage means and adapted to be actuated by an engine intake suction pressure, pressure adjusting means for adjusting the intake suction pressure applied to said control valve means, control means for producing a control signal adapted for controlling said pressure adjusting means, first sensing means for sensing engine operating conditions and producing engine operating condition signals which are applied to said control means, second sensing means for sensing engine intake suction pressure and producing suction pressure signals which are applied to said control means, third sensing means for sensing special engine conditions and producing special condition signals which are applied to said control means, memory means associated with said control means and containing compensating factors corresponding to various values of the suction pressure signals and the special condition signals, said control means taking an appropriate one of said compensating factors in accordance with the suction pressure signal and the special condition signal to compensate said control signal.

According to a preferable aspect of the present invention, the pressure adjusting means includes a duty factor solenoid valve and the memory means includes memories of duty factors corresponding to various combinations of engine speed and engine intake suction pressure. For a special condition of the engine such as a low engine temperature, compensations may be effected on the duty factors in accordance with the engine intake suction pressure and the special condition such as the temperature of the engine. The factors for such compensation may be determined experimentally so that optimum results can be obtained even under such special condition.

The above and other objects and features will become apparent from the following descriptions of a preferred embodiment taking reference to the accompanying drawings, in which.

Figure 1:
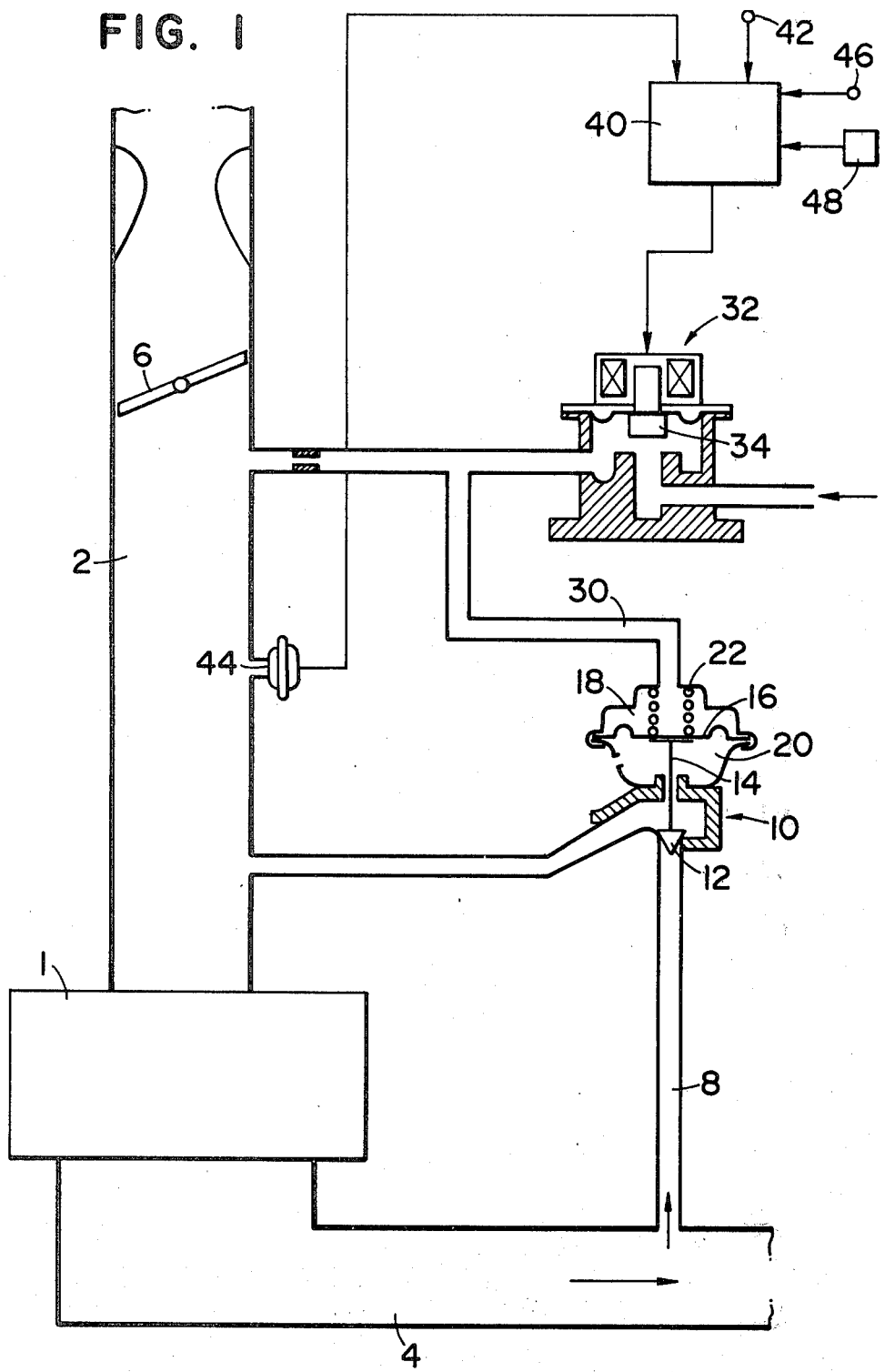
FIG. 1 is a diagrammatical illustration of an engine exhaust gas recirculation system in accordance with one embodiment of the present invention.

Referring now to the drawings, particularly to FIG. 1, the engine 1 shown therein includes an intake passage 2 for drawing combustible mixture and an exhaust passage 4 for exhausting combustion gas. In the intake passage 2, there is provided a throttle valve 6. The exhaust gas recirculating system includes a gas recirculation passage 8 connecting the exhaust passage 4 with the intake passage 2 downstream of the throttle valve 6 so that a part of the exhaust gas is recirculated from the exhaust passage 4 to the intake passage 2. The gas recirculation passage 8 is provided with a recirculation control valve 10 for controlling the amount of the exhaust gas recirculated to the intake passage 2.

The control valve 10 includes a valve member 12 which functions to determine the effective area of the passage 8. The valve member 12 is connected through a rod 14 with a diaphragm 16 which defines a suction pressure chamber 18 and an atmospheric pressure chamber 20 at the opposite sides thereof. In the suction pressure chamber 18, there is provided a spring 22 which resiliently biases the diaphragm 16 and the valve member 12 toward the closed position. When a suction pressure is drawn into the suction pressure chamber 18, the diaphragm 16 is moved against the influence of the spring 22 to thereby move the valve member 12 to the open position. The effective area of the gas recirculation passage 8 is determined by the position of the valve member, which is in turn determined by the strength of the suction pressure in the chamber 18.

The suction pressure chamber 18 of the control valve 10 is connected through a suction pressure line 30 with the intake passage 2 downstream of the throttle valve 6. The suction pressure line 30 is opened to the atmosphere through a pressure adjusting valve 32 which includes a duty factor solenoid valve 34. The duty factor solenoid valve 34 is connected with a control circuit so that the valve 34 is cyclically energized to open in accordance with the signal from the control circuit 40. The time period of energization of the solenoid valve 34 in a cycle is determined by the signal from the control circuit 40.

The control circuit 40 receives signals from an engine speed sensor 42, an intake suction pressure sensor 44 and an engine temperature sensor 46. The intake suction pressure sensor 44 detects the pressure in the intake passage 2 downstream of the throttle valve 6 and the engine temperature sensor 46 detects the temperature of the engine cooling medium. The control circuit 40 is further associated with a memory device 48 which includes a map $M_1$ memorizing duty factors $D_1$ for normal engine operations, a map $M_2$ memorizing duty factors $D_2$ with which the control valve 10 starts to open under various values of the intake suction pressure and a map $M_3$ for a compensation factor for a low temperature operation.

Figure 2:
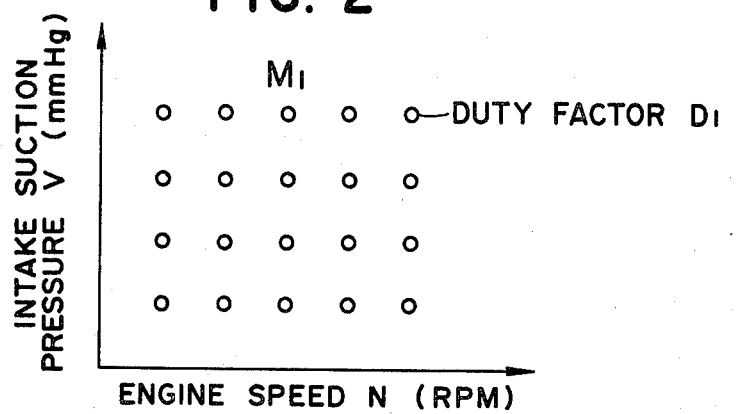
FIG. 2 shows a map for duty factors for controlling the suction pressure adjusting valve under normal operations of the engine.
Figure 3:
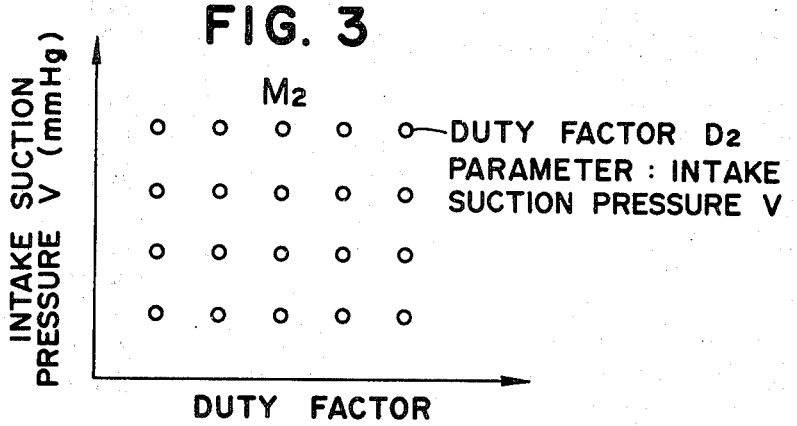
FIG. 3 shows a map for duty factors with which the control valve starts to open under various values of the intake suction pressure.
Figure 4:
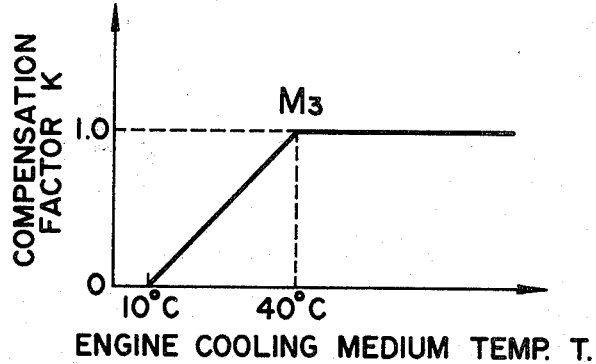
FIG. 4 is a chart for determining the compensation factor for low temperature engine operations; and, FIG. 5 is a chart showing the steps of compensating the duty factors under a special condition of the engine.

Referring to FIG. 2, the map $M_1$ includes memories of the duty factors $D_1$ for various combinations of the engine speed N and the intake suction pressure V. In FIG. 3, there is shown the map $M_2$ which includes the duty factors $D_2$ with which the control valve 10 starts to open under various values of the intake suction pressure. FIG. 4 shows the map $M_3$ which determines the compensation factor K under an engine temperature below a predetermined value.

Figure 5:
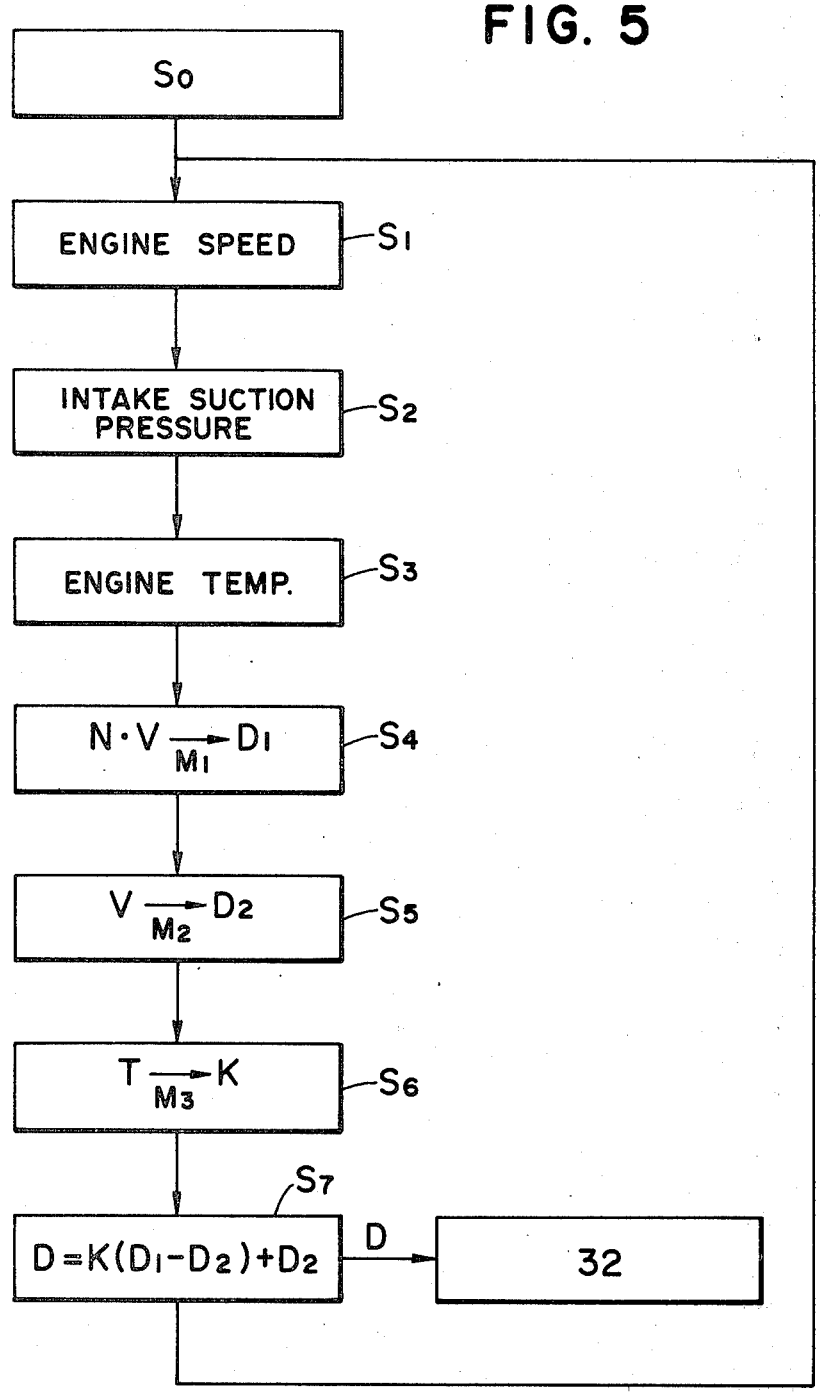

Referring now to FIG. 5 which shows the function of the control circuit 40, the circuit 40 receives the engine speed signal N from the engine speed sensor 42 in the step $S_1$, the intake suction pressure signal V from the suction pressure sensor 44 in the step $S_2$ and the engine temperature signal T from the temperature sensor 46 in the step $S_3$, and memorizes these input signals in predetermined addresses. Then, a specific one of the duty factors $D_1$ is picked up from the map $M_1$ in accordance with the engine speed signal N and the intake suction pressure signal V in the step $S_4$ and the specific duty factor $D_1$ is memorized in a predetermined address. In the step $S_5$, a specific one of the duty factors $D_2$ is picked up in the map $M_2$ in accordance with the engine intake suction pressure signal V, and the specific duty factor $D_2$ is memorized in a predetermined address. Thereafter, in the step $S_6$, a compensation factor K is determined in the map $M_3$ in accordance with the engine temperature signal T and the compensation factor K is memorized in a predetermined address.

In the step $S_7$, a duty factor D is then calculated based on the equation $$D = K(D_1 - D_2) + D_2$$

in accordance with the factors $D_1$, $D_2$ and K. The solenoid valve 34 is energized in accordance with the duty factor D. The aforementioned steps are cyclically repeated so that the valve member 12 of the control valve 10 is maintained in the most desirable position for providing an appropriate amount of exhaust gas recirculation. Thus, the duty factor for energizing the solenoid valve 34 is modified in accordance with the intake suction pressure and the special engine condition such as the low engine temperature. Therefore, it is possible to control the exhaust gas recirculation appropriately even under a special condition of the engine.

The invention has thus been shown and described with reference to a specific embodiment, however, it should be noted that the invention is in no way limited to the details of the illustrated structures but changes and modifications may be made without departing from the scope of the appended claims. For example, the engine operating condition may be detected in terms of a combination of the engine speed and the throttle valve position or the intake suction pressure and the throttle valve position. Alternatively, the intake air flow may directly be detected by an air flowmeter. The duty factor solenoid valve 34 in the illustrated embodiment may be substituted by a proportionated solenoid valve. in the illustrated embodiment may be substituted by a proportionated solenoid valve.

I claim:

1. An exhaust gas recirculation system for an internal combustion engine having intake and exhaust systems, said recirculation system comprising gas recirculation passage means for directing a part of the engine exhaust gas from the exhaust system to the intake system, recirculation rate control valve means provided in said gas recirculation passage means and adapted to be actuated by an engine intake suction pressure, pressure adjusting means for adjusting the intake suction pressure applied to said control valve means, first sensing means for sensing engine operating conditions and producing engine operating condition signals, control means for producing a control signal in response to the signals from said first sensing means, second sensing means for sensing engine intake suction pressure and producing suction pressure signals which are applied to said control means, third sensing means for sensing special engine conditions and producing special condition signals which are applied to said control means, first memory means associated with said control means and containing first compensating factors corresponding to various values of the suction pressure signals, second memory means associated with said control means and containing second compensating factors corresponding to various values of the special condition signals, said control means taking an appropriate one of said first compensating factors in accordance with the suction pressure signal and an appropriate one of said second compensating factors in accordance with the special condition signal to compensate said control signal, said control signal being applied to said pressure adjusting means to operate the same.

2. An exhaust gas recirculating system in accordance with claim 1 in which said pressure adjusting means includes duty factor solenoid valve means, third memory means being provided and including memories of duty factors for the solenoid valve means corresponding to various combinations of engine speed and engine intake suction pressure, said first and second compensating factors being for compensating said duty factors in accordance with the engine intake suction pressure and a special condition of the engine, respectively.

3. An exhaust gas recirculating system in accordance with claim 1 in which said control valve means is of a diaphragm type.

4. An exhaust gas recirculation system in accordance with claim 1 in which said first sensing means includes an engine speed and intake suction pressure sensors.

5. An exhaust gas recirculation system in accordance with claim 1 in which said third sensing means includes an engine temperature sensor.

6. An exhaust gas recirculation system in accordance with claim 2 in which said first memory means includes memories on duty factors with which said control valve means starts to open under various values of intake suction pressure, said second memory means including memories on compensation factors under various engine temperatures.

7. An exhaust gas recirculation system for an internal combustion engine having intake and exhaust systems, said recirculation system comprising gas recirculation passage means for directing a part of the engine exhaust gas from the exhaust system to the intake system, pressure responsive recirculation rate control valve means provided in said gas recirculation passage means and adapted to be acutated by an engine intake suction pressure, pressure adjusting means for adjusting the intake suction pressure applied to said control valve means, said pressure adjusting means including pressure relief valve means actuated by duty factor solenoid means, first sensing means for sensing engine operating conditions and producing engine operating condition signals, control means for producing a control signal in response to the signals from said first sensing means, first memory means memorizing first duty factors corresponding to various values of said engine operating condition signals, said control means including means for taking appropriate one $D_1$ of the first duty factors in accordance with the engine operating condition signals, second sensing means for sensing engine intake suction pressure and producing suction pressure signals which are applied to said control means, third sensing means for sensing engine temperature and producing engine temperature signals which are applied to said control means, second memory means memorizing second duty factors corresponding to various values of the suction pressure signals, third memory means memorizing compensating factors which are dependent on the engine temperature, said control means including means for taking an appropriate one $D_2$ of said second duty factors in accordance with the suction pressure signal and means for determining an appropriate compensating factor K in accordance with said engine temperature signal, and control means further including means for performing an operation under a formula $$D=K(D_1-D_2)+D_2$$

for determining a duty factor D which is applied to said solenoid means.

* * * * *